US010877277B1

(12) United States Patent
Lu et al.

(10) Patent No.: US 10,877,277 B1
(45) Date of Patent: Dec. 29, 2020

(54) LIQUID CRYSTAL ALVAREZ LENS

(71) Applicant: Facebook Technologies, LLC, Menlo Park, CA (US)

(72) Inventors: Lu Lu, Kirkland, WA (US); Fenglin Peng, Kirkland, WA (US); Wai Sze Tiffany Lam, Redmond, WA (US); Scott Charles McEldowney, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 28 days.

(21) Appl. No.: 16/026,750

(22) Filed: Jul. 3, 2018

Related U.S. Application Data

(60) Provisional application No. 62/658,550, filed on Apr. 16, 2018.

(51) Int. Cl.
*G02B 15/14* (2006.01)
*G02B 27/01* (2006.01)
*G02B 26/08* (2006.01)
*F21V 8/00* (2006.01)

(52) U.S. Cl.
CPC ....... *G02B 27/0172* (2013.01); *G02B 6/0056* (2013.01); *G02B 26/0875* (2013.01); *G02B 2027/0123* (2013.01)

(58) Field of Classification Search
CPC ........ G02B 13/14; G02B 3/12; G02B 26/005; G02B 26/0825; G02B 26/06; G02B 26/08; G02B 26/004; G02B 27/0172; G02F 1/133504
See application file for complete search history.

(56) References Cited

U.S. PATENT DOCUMENTS

| 10,317,680 | B1 * | 6/2019 | Richards | ............ G02B 27/0172 |
| 2016/0219269 | A1 * | 7/2016 | Tekolste | ............... G02B 5/1814 |
| 2019/0011612 | A1 * | 1/2019 | Mastrangelo | ...... G02B 27/0172 |

OTHER PUBLICATIONS

Petsch et al , "Ultrathin Alvarez Lens system actuated by artificial muscles"; Applied Optics vol. 55, No. 10; pp. 2718-2723; Apr. 1, 2016 (Year: 2016).*

* cited by examiner

*Primary Examiner* — Alicia M Harrington
(74) *Attorney, Agent, or Firm* — Matthew A. Pequignot; Pequignot + Myers

(57) ABSTRACT

A varifocal liquid crystal lens in Alvarez configuration is disclosed. A head mounted or near-eye display may include a liquid crystal Alvarez lens for focus adjustment for user sight accommodation, vergence accommodation, etc. The liquid crystal Alvarez lens may be of various types, such as Pancharatnam-Berry phase (PBP) lens or a polarization volume holographic lens.

16 Claims, 16 Drawing Sheets

US 10,877,277 B1

LIQUID CRYSTAL ALVAREZ LENS

CROSS REFERENCE TO RELATED APPLICATIONS

The present invention claims priority from U.S. Patent Application No. 62/658,550, filed on Apr. 16, 2018, and incorporated herein by reference in its entirety.

TECHNICAL FIELD

The present disclosure relates to optical components and modules, and in particular to lenses having adjustable focal length, and display modules and headsets incorporating such lenses.

BACKGROUND

Head mounted displays (HMDs) and near-eye displays (NEDs) are used to provide virtual scenery to a user, or to augment real scenery with additional information or additional virtual objects. Stereoscopic images can be displayed e.g. by providing separate images to each eye of the user. In some HMD or NED systems, a head and/or eye position and orientation of the user are tracked, and the displayed 3D scenery is adjusted in real time depending on the user's head orientation and gaze direction to provide an illusion of the user immersed into a simulated or augmented three-dimensional scenery. Such a 3D scenery, however, can cause visual fatigue and nausea resulting from a limited capability of existing headsets to properly compensate for a discrepancy between eye vergence and visual distance accommodation, known as vergence-accommodation conflict.

BRIEF DESCRIPTION OF THE DRAWINGS

Exemplary embodiments will now be described in conjunction with the drawings, in which.

DETAILED DESCRIPTION

Figure 1:
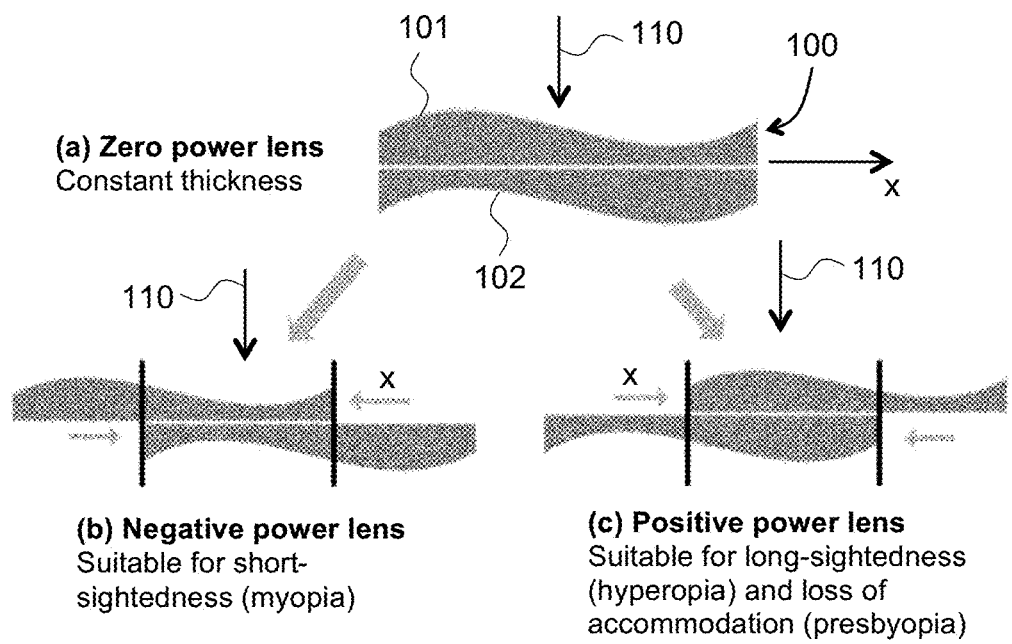
FIG. 1 is a cross-sectional side view of conventional Alvarez lenses.

While the present teachings are described in conjunction with various embodiments and examples, it is not intended that the present teachings be limited to such embodiments. On the contrary, the present teachings encompass various alternatives and equivalents, as will be appreciated by those of skill in the art.

To provide a head mounted display with ability to compensate for vergence and accommodation conflict, the lens system of the display should be capable of quick and reliable adjustment of focus. For example, when a virtual scene involves an approaching object, the changing vergence of the user's eyes should be accompanied by an corresponding change of the focusing power of the lens system. As the virtual scene evolves, the user might direct their gaze towards virtual objects at various distances, with different vergence. The focusing power of the lens (also termed optical power of the lens) will need to be quickly adjusted for vergence in each gaze direction, to reduce or avoid a visual fatigue of a user.

In accordance with the present disclosure, there is provided a liquid crystal (LC) Alvarez lens comprising optically coupled first and second LC Alvarez lens components each having an Alvarez spatial profile of optical phase delay. The LC Alvarez lens is configured for laterally displacing the first and second LC Alvarez lens components relative to one another for adjusting optical power of the LC Alvarez lens.

In one embodiment, the Alvarez spatial profile of optical phase delay comprises a cubic profile $T(x,y)=A_x x^3+A_x' yx^2+A_y y^3+A_y' xy^2+Ex+Fy+G$, wherein x, y are coordinates in a plane perpendicular to an optical axis of the LC Alvarez lens, and $A_x$, $A_x'$, $A_y$, $A_y'$, E, F, and G are constants. At least one of the first and second LC Alvarez lens components may include an LC layer in the x, y plane having a thickness d and effective refractive index n(x,y), such that T(x,y)=2πdn(x,y)/λ, wherein λ is wavelength.

In one embodiment, at least one of the first and second LC Alvarez lens components comprises an LC layer having a birefringence of odd number of half wavelengths. The LC layer may have an azimuthal angle of LC molecules θ spatially varying in plane of the LC layer such that a spatial variation of θ is defined by a cubic polynomial θ(x,y)= ½($A_x x^3 + A_x' yx^2 + A_y y^3 + A_y' xy^2 + Ex + Fy + G$), wherein x, y are coordinates in the plane of the LC layer, and $A_x, A_x', A_y, A_y'$, E, F, and G are constants. At least one of the first and second LC Alvarez lens components may further include a retardation sheet for widening a viewing angle of the LC Alvarez lens. The retardation sheet may include a birefringent film having a birefringence axis perpendicular to plane of the birefringent film.

In one embodiment, each one of the first and second LC Alvarez lens components comprises a Pancharatnam-Berry phase (PBP) LC lens having an azimuthal angle of LC molecules θ spatially varying in plane of the LC layer, such that a spatial variation of θ is defined by a cubic polynomial θ(x,y)=½($A_x x^3 + A_x' yx^2 + A_y y^3 + A_y' xy^2 + Ex + Fy + G$), wherein x, y are coordinates in the plane of the LC layer, and $A_x, A_x', A_y, A_y'$, E, F, and G are constants. Each PBP LC lens may include a stack of PBP LC lens elements. Each PBP LC lens element may have a birefringence of odd number of half wavelengths at one color channel, and even number of half wavelengths at remaining color channels.

In one embodiment, at least one of the first and second LC Alvarez lens components comprises an LC layer having a tilt angle of LC molecules relative to a plane of the LC layer, wherein the tilt angle spatially varies across the plane of the LC layer. The at least one of the first and second LC Alvarez lens components may include at least one of polarization volume holographic LC lens or a LC Fresnel lens. Each one of the polarization volume holographic LC lens or a LC Fresnel lens may include a retardation sheet for widening a viewing angle of the Alvarez lens.

In one embodiment, the LC Alvarez lens further includes a linear polarizer and a quarter-wave waveplate disposed in an optical path upstream of the first and second LC Alvarez lens components. In this embodiment, the linear polarizer may be disposed upstream of the quarter-wave waveplate, with the quarter-wave waveplate oriented to produce a circular polarization of light propagated through the quarter-wave waveplate. The linear polarizer and a quarter-wave waveplate may also be disposed downstream of the first and second LC Alvarez lens components. In this embodiment, the linear polarizer may be disposed downstream of the quarter-wave waveplate, with the quarter-wave waveplate oriented to produce a linear polarization of light propagated through the quarter-wave waveplate.

Each one of the first and second LC Alvarez lens component may include a plurality of LC Alvarez lens elements configured for operation in unpolarized light. An actuator may be provided for displacing the first and second LC Alvarez lens components relative to one another laterally with respect to an optical axis of the LC Alvarez lens.

In accordance with the present disclosure, a near-eye display module is provided comprising any one of the above LC Alvarez lenses, a phase element disposed in an optical path upstream of the LC Alvarez lens, and a waveguide disposed in the optical path upstream of the phase element.

In one embodiment, the waveguide comprises a polarizing waveguide, and the phase element comprises a quarter-wave waveplate oriented to produce a circular polarization of light propagated through the quarter-wave waveplate. In one embodiment, the phase element includes a spatially varying retarder; in operation, the waveguide produces light with at least one of polarization axis or ellipticity spatially varying across a clear aperture of the waveguide. The spatially varying retarder may include an LC layer with at least one of azimuthal angle or tilt angle of LC molecules of the LC layer spatially varying to produce a circular polarization of light propagated through the spatially varying retarder.

In accordance with the disclosure, there is further provided a method for adjusting focus of a visual display, the method comprising propagating light emitted by the visual display through optically coupled first and second LC Alvarez lens components each having an Alvarez spatial profile of optical phase delay; and displacing the first and second LC Alvarez lens components relative to one another and laterally with respect to an optical axis of the LC Alvarez lens, to adjust the focus.

Referring now to FIG. 1, a conventional adjustable-focus Alvarez lens 100 includes first 101 and second 102 refractive lens elements. In position (a), the first 101 and second 102 refractive lens elements are disposed such that the lens thickness is constant in x-direction, such that the Alvarez lens 100 substantially does not refract impinging light 110. In position (b), the first 101 and second 102 lens elements are shifted such that a negative lens is formed, as shown. In position (c), the first 101 and second 102 refractive lens elements are shifted such that a positive lens is formed. In the Alvarez configuration, a change of the optical power, i.e. focusing/defocusing power, is produced when the first 101 and second 102 refractive lens elements are moved in opposite directions, or when at least one refractive lens element 101 or 102 is moved.

Figure 2:
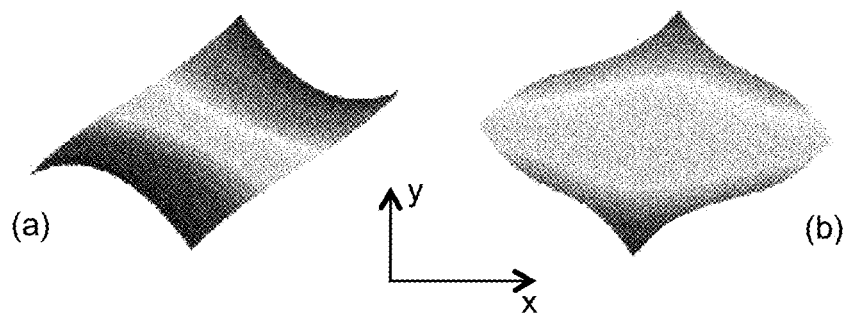
FIG. 2 is a grayscale surface profile map of a conventional Alvarez lens.

The surface profiles of the first 101 and second 102 refractive Alvarez lens elements can be generally represented by a cubic polynomial. This is true for Alvarez configuration, and also for a related Lohmann configuration. Referring to FIG. 2, Alvarez cubic surface profile map is shown at (a), and a Lohmann cubic surface profile map is shown at (b). In Lohmann configuration, a lateral shift in the x direction provides a cylindrical optical power; to induce a spherical power change, the first 101 and second 102 refractive lens elements need to be moved in both x and y directions. Herein, both Alvarez and Lohmann lens types will be termed Alvarez lenses for brevity.

Figure 3A:
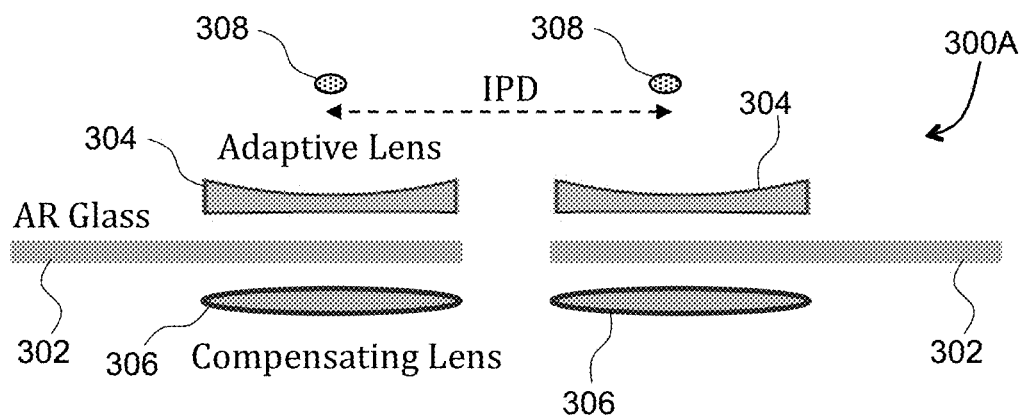
FIG. 3A is a schematic cross-sectional view of augmented reality (AR) display of the present disclosure, including liquid crystal (LC) Alvarez lenses for focus adjustment.

Referring to FIG. 3A, an augmented reality (AR) display 300A of the present disclosure includes an AR optics block, or "glass" 302, coupled to a liquid crystal (LC) Alvarez "adaptive lens" 304. The function of the LC Alvarez adaptive lens 304 is to dynamically adjust focus of light provided by the AR glass 302, to lessen a vergence-accommodation conflict. A compensating lens 306 may be provided to compensate for optical power of the adaptive lens 304, such that the combination of the adaptive lens 304 and the compensating lens 306 leaves the real-world image unaltered, that is, as if viewed without any lenses. If required, a prescription glasses function may also be provided. Depending the users' eyesight, i.e. short-sighted or long-sighted, the sum optical power of the adaptive lens 304 and the compensating lens 306 may be adjusted to provide the user's prescription correction for the real-world image. Two sets of optics provide two exit pupils 308 spaced apart at a typical inter-pupillary distance (IPD) of a human user.

Figure 3B:
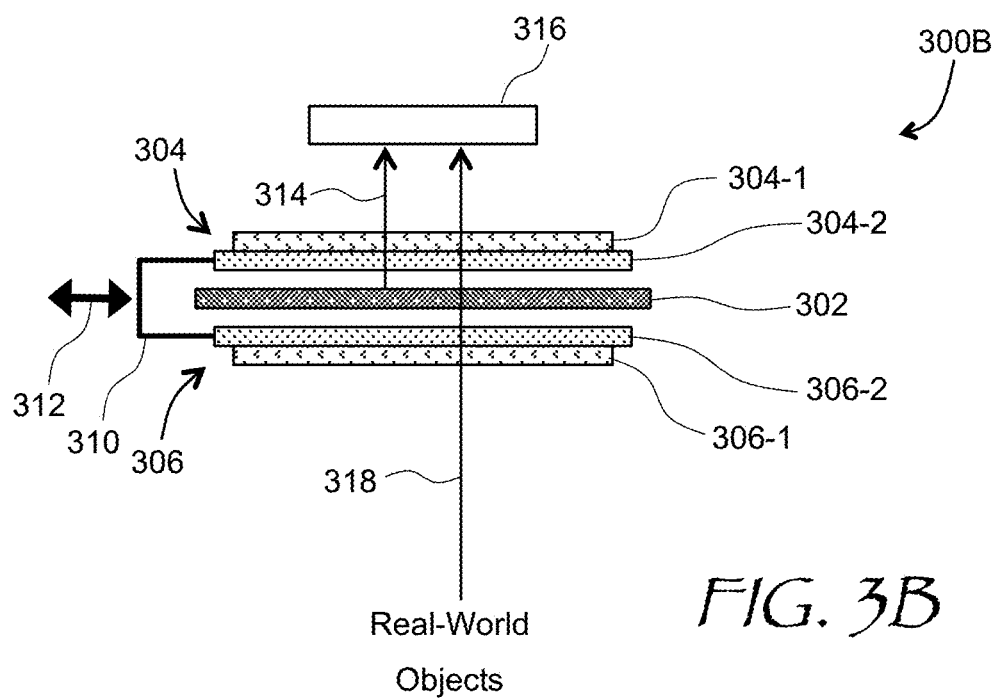
FIG. 3B is a schematic cross-sectional view of an embodiment of the AR display of FIG. 3A including matching pairs of LC Alvarez lenses.

At least one of the adaptive lens 304 or the compensating lens 306 may include an LC Alvarez lens. In embodiments where both the adaptive lens 304 and the compensating lens 306 include LC Alvarez lenses, the optical power of the compensating lens 306 needs to cancel out the optical power of the adaptive lens 304, or to provide a constant difference of the optical power corresponding to the eyesight of a user. FIG. 3B shows an embodiment 300B of the AR display 300A where both the adaptive lens 304 and the compensating lens 306 are LC Alvarez lenses. The adaptive LC Alvarez lens 304 includes first 304-1 and second 304-2 adaptive LC Alvarez lens components movable with respect to one another. The compensating LC Alvarez lens 306 includes first 306-1 and second 306-2 compensating LC Alvarez lens components movable with respect to one another, for compensation of optical power of corresponding adaptive LC Alvarez lens components. The first compensating LC Alvarez lens component 306-1 may be configured to compensate the first adaptive LC Alvarez lens component 304-1, and the second compensating LC Alvarez lens component 306-2 may be configured to compensate the second adaptive LC Alvarez lens component 304-2. To provide a proper compensation as the first 304-1 and second 304-2 adaptive LC Alvarez lens components are moved, the second LC Alvarez lens components 304-2 and 306-2 need to be moved synchronously. By way of a non-limiting example, these two lens components may be mechanically coupled together with a bracket 310, such that the second LC Alvarez lens components 304-2 and 306-2 are movable together as a unit (arrow 312), to achieve the required synchronicity of movement.

In operation, the adaptive LC Alvarez lens 304 couples image light 314 generated by the AR glass 302 to a user's eye shown schematically at 316. Light 318 from real-world objects will propagate through both the compensating 306 and adaptive 304 LC Alvarez lenses, and will remain unaltered, or constantly corrected for user's vision, due to the compensating property of the compensating LC Alvarez lens 306.

Figure 3C:
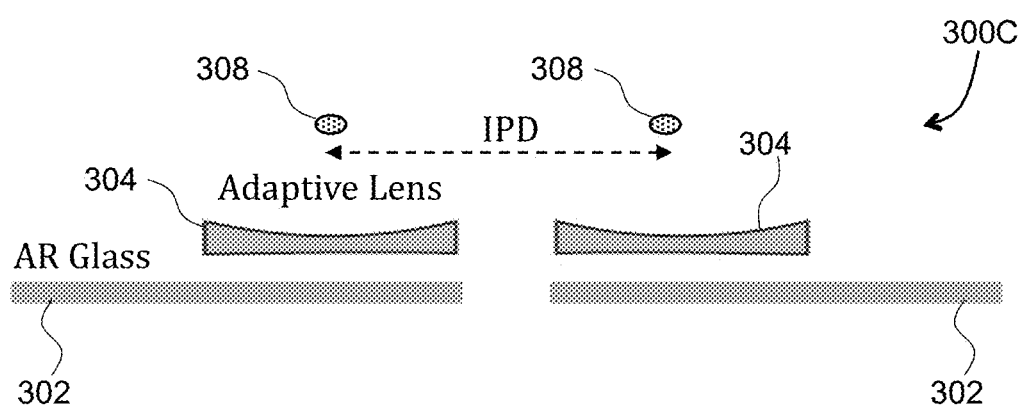
FIG. 3C is a schematic cross-sectional view of a virtual reality (VR) display of the present disclosure, including LC Alvarez lenses for focus adjustment.

FIG. 3C depicts virtual reality (VR) display 300C. The VR display 300C is similar to the AR display 300A of FIG. 3A, but lacks the compensating lenses 306, since no real-world scenery is observed.

An LC Alvarez lens of the present disclosure adds a spatial optical phase profile to a propagating optical beam. The added optical phase profile, i.e. a spatially varying phase delay imparted on the optical beam by the LC Alvarez lens, can be configured to modify the wavefront of the propagating optical beam for focusing or defocusing the beam. The LC Alvarez lens may include two Alvarez lens components, e.g. the first 304-1 and second 304-2 components of the adaptive LC Alvarez lens 304, and the first 306-1 and second 306-2 components of the compensating LC Alvarez lens 306 of FIG. 3B. The two components may be mechanically shifted relative to one another to vary the optical power of the lens. The optical power of each LC Alvarez lens component is determined by a cubic optical phase profile T(x,y), defined as $$T(x,y)=2\pi d n(x,y)/\lambda = A_x x^3 + A_x' y x^2 + A_y y^3 + A_y' x y^2 + B x^2 + C x y + D y^2 + E x + F y + G \quad (1)$$

where d is the lens thickness, n(x,y) is the local effective refractive index, $\lambda$ is a wavelength of the optical beam propagating through the LC Alvarez lens component, and $A_x, A_x', A_y, A_y'$, B, C, D, E, F, and G are constants. In Alvarez configuration, $A_y = A_y' = 0$, and in Lohmann configuration, $A_x' = A_y' = 0$. As noted above, the term "LC Alvarez lens" includes both configurations, for brevity. The terms B, C, and D are usually set to zero for both configurations.

In LC Alvarez lens components, the thickness of the LC layer may be kept constant, and the spatial variation of the effective refractive index of the LC layer n(x,y) creates the Alvarez spatial optical phase profile, i.e.

$$n(x,y)=(\lambda/2\pi d)(A_x x^3 + A_x' y x^2 + A_y y^3 + A_y' x y^2 + B x^2 + C x y + D y^2 + E x + F y + G) \quad (2)$$

The LC layer is very thin, typically 4-12 micrometers. Thus, most of the thickness of an LC lens is the substrate thickness, which can be made e.g. 0.3-0.9 mm thick. Accordingly, an LC Alvarez lens can be very thin and lightweight. This also reduces the power consumption of a mechanical actuator for shifting the LC Alvarez lens components relative to one another.

Figure 4A:
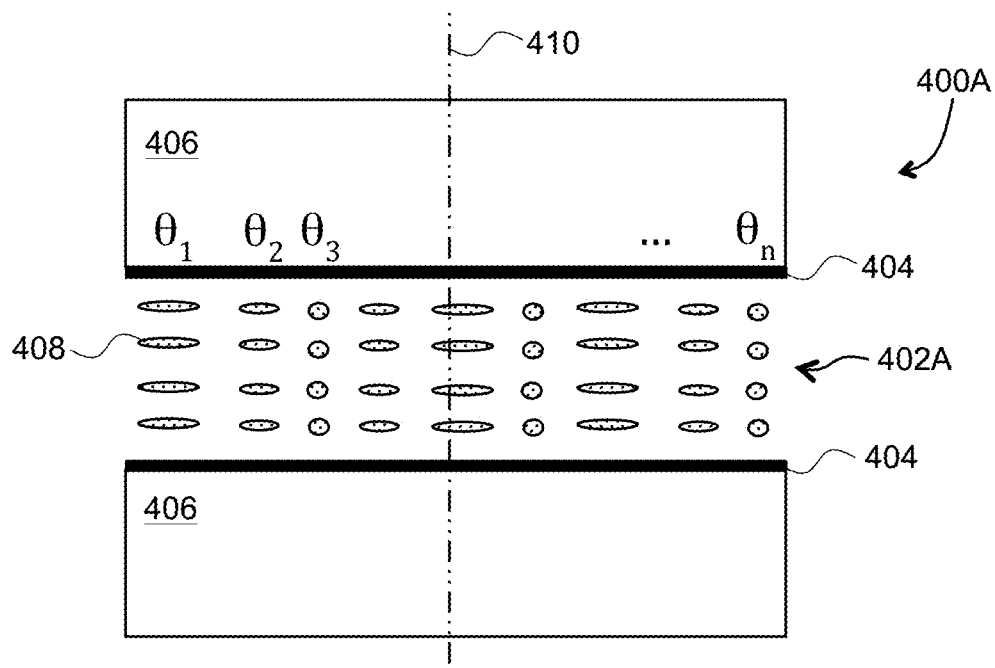
FIG. 4A is a schematic cross-sectional view of LC molecules in an LC Pancharatnam-Berry phase (PBP) Alvarez lens component.

Several embodiments of LC Alvarez lenses of the present disclosure will now be considered. Referring to FIG. 4A, a Pancharatnam-Berry phase (PBP) LC Alvarez lens component 400A includes an LC layer 402A between alignment layers 404, each supported by a LC cell substrate 406. In the embodiment shown in FIG. 4A, the LC layer 402A has an azimuthal angle $\theta_1, \theta_2, \ldots \theta_n$ of liquid crystal molecules 408 varying in plane of the liquid crystal layer 402A, that is, in a plane parallel to the alignment layers 404 and the LC cell substrates 406, and perpendicular to an optical axis 410 of the Pancharatnam-Berry phase (PBP) LC Alvarez lens component 400A.

In accordance with the present disclosure, the PBP LC Alvarez lens component 400A is configured to have an Alvarez phase profile $T_{PBP}(x,y)=T(x,y)$ of Eq. (1). For an embodiment where the LC layer 402A has optical retardation, i.e. layer birefringence multiplied by layer thickness, of half a wavelength, a local PBP $T_{PBP}(x,y)$ can be conveniently calculated as two times the azimuthal angle $\theta(x,y)$ of liquid crystal molecules 408:

$$T_{PBP}(x,y)=2\theta(x,y) \quad (3)$$

By combining Eqs. (1) and (3), one obtains that the spatial variation of the azimuthal angle $\theta$ is defined by a cubic polynomial $$\theta(x,y)=\frac{1}{2}(A_x x^3 + A_x' y x^2 + A_y y^3 + A_y' x y^2 + B x^2 + C x y + D y^2 + E x + F y + G) \quad (4)$$

Thus, the spatial variation of the PBP and the spatial variation of the azimuthal angle $\theta$ of the liquid crystal molecules 408 in the LC layer 402A of the PBP LC Alvarez lens component 400A are represented by cubic polynomials. For AR applications where both the adaptive 304 and compensating 306 LC Alvarez lenses include PBP LC lens components, the azimuthal angles of the corresponding adaptive (e.g. 304-1; see FIG. 3B) and compensating (e.g. 306-1) PBP LC Alvarez lens components may be selected to differ by 90 degrees across the entire clear aperture of the lenses, thus erasing the total birefringence for the light 318 from real-world objects, and cancelling the PBP effect and associated focusing/defocusing power for such light, for a broad band of wavelengths.

Figure 4B:
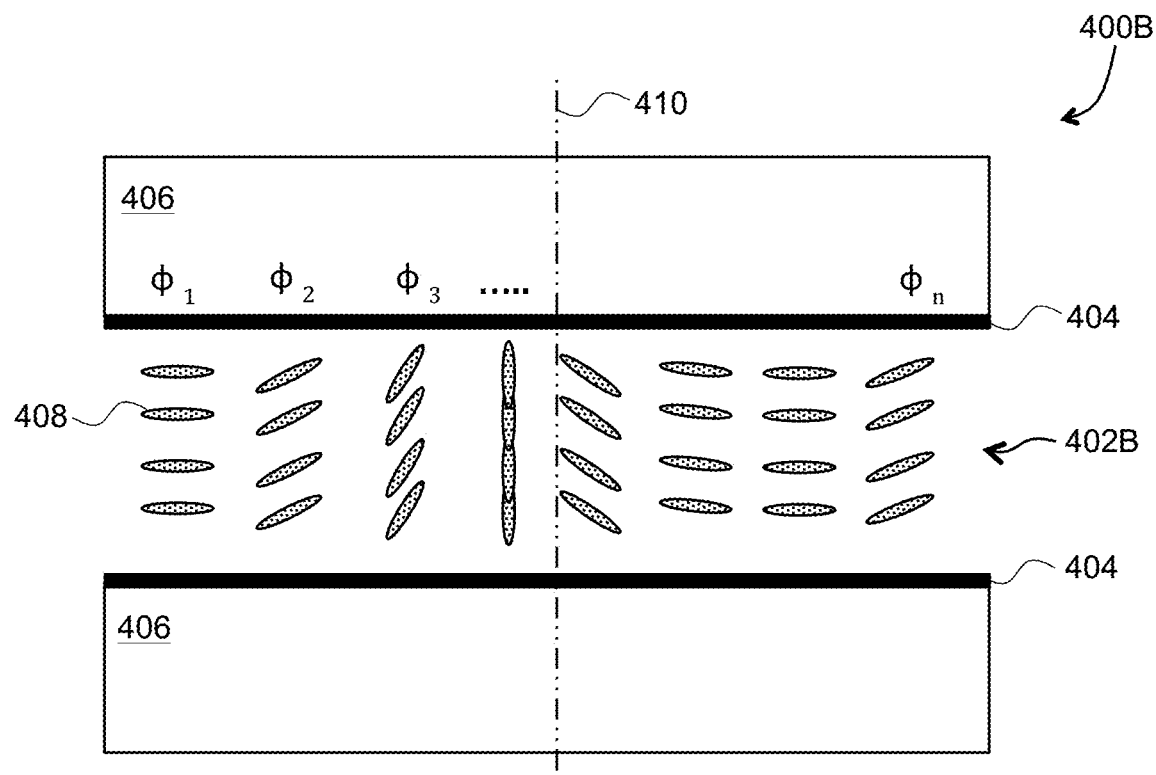
FIG. 4B is a schematic cross-sectional view of LC molecules with a spatially variable tilt angle in an LC Alvarez lens component.

Turning now to FIG. 4B, an LC Alvarez lens component 400B is similar to the LC Alvarez lens component 400A of FIG. 4A. The Alvarez lens component 400B of FIG. 4B includes an LC layer 402B having a tilt angle $\phi_1, \phi_2, \ldots \phi_n$ of the LC molecules 408 spatially varying out of plane of the liquid crystal layer 402B. In other words, the tilt angle $\phi_1, \phi_2, \ldots \phi_n$ of the LC molecules 408 relative to a plane of the LC layer 402B varies in x,y plane, which is parallel to the plane of the LC layer 402B, and is perpendicular to the optical axis 410. In one embodiment, the LC molecules 408 with the spatially varying tilt angle $\phi_1, \phi_2, \ldots \phi_n$ form a Fresnel LC lens or, in another embodiment, polarization volume holographic LC lens having an optical phase delay profile of an Alvarez lens component. The profile of optical phase delay of these lenses can be represented by Eq. (1), and corresponds to that of a refractive Alvarez lens. Any of the LC Alvarez lens components 400A or 400B can be used to form an LC Alvarez lens, in which the spatial variation of the effective refractive index n(x,y) follows Eq. (2) above. A polarizer may be disposed upstream of LC Alvarez lens for conditioning the polarization state of incoming light. A polarizer may also be disposed downstream of the LC Alvarez lens.

Figure 5A:
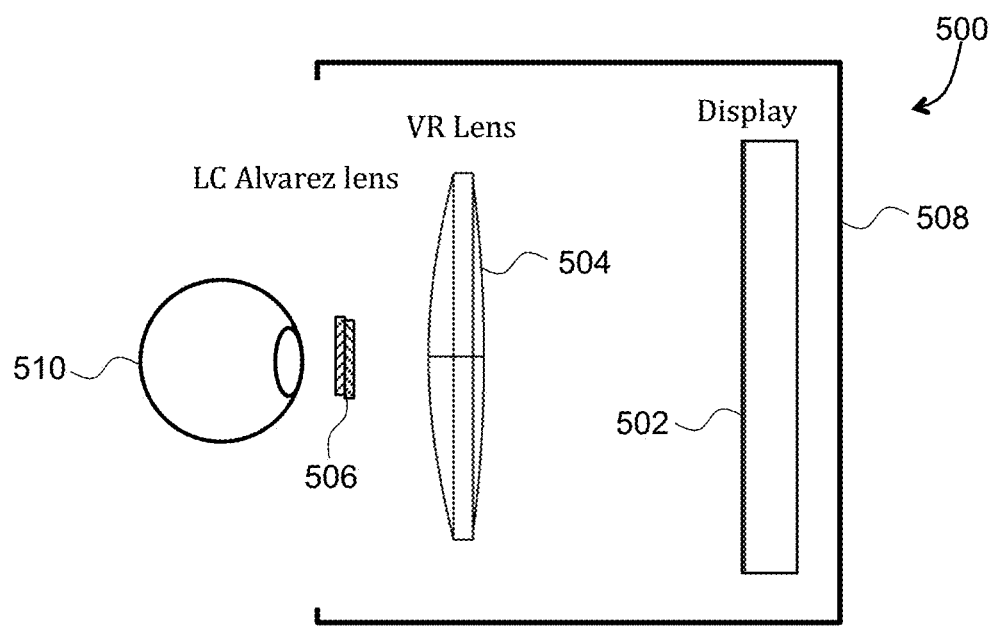
FIG. 5A is a side cross-sectional view of a virtual reality (VR) HMD including an LC Alvarez lens.

Referring to FIG. 5A, a virtual reality (VR) head-mounted display (HMD) 500 includes an electronic display 502, a VR lens 504, and an LC Alvarez lens 506 mounted inside a body 508. An image light from the electronic display 502 is redirected by the VR lens 504 to propagate towards a user's eye 510 through the LC Alvarez lens 506. The LC Alvarez lens 506 may include any of the LC Alvarez lens components described above. The function of the LC Alvarez lens 506 is to provide a focus adjustment depending upon a gaze direction of a user viewing a virtual scenery. The focal adjustment may be performed by shifting Alvarez lens components relative to one another. It is further noted that the LC Alvarez lens 506 may also be used to compensate for nearsighted or farsighted vision of individual users.

Figure 5B:
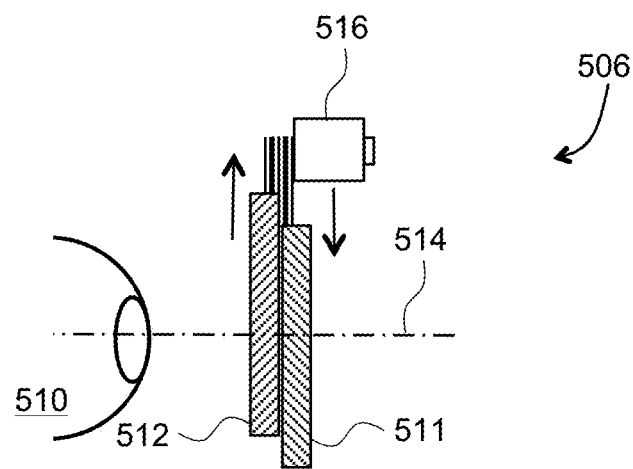
FIG. 5B is a magnified side cross-sectional view of the LC Alvarez lens of FIG. 5A.

Turning to FIG. 5B, the LC Alvarez lens 506 can include first 511 and second 512 LC Alvarez lens components, each of which can include any one of the LC Alvarez lens components described above. The first 511 and second 512 LC Alvarez lens components are matched to each other to provide a variable optical power when shifted with respect to one another and laterally with respect to a common optical axis 514. To that end, an actuator 516, e.g. a small DC, piezo, or stepper motor, may be provided. The actuator 516 may be mechanically coupled to the first 511 and/or the second 512 LC Alvarez lenses to produce the lateral movement. Since the lenses 511,512 are small, typically measuring 3 cm×4 cm or less with a weight of only about 3 grams or less with thin substrates, a low power is required to move the lenses. As an estimate, a 4.5 Diopter optical power adjustment range can be obtained by using only about 0.1 mW of power to displace the lenses by about 3 mm. Both varifocal and multi-focal lenses can be created. Herein, the term "varifocal lens" is used to denote both varifocal and multi-focal lenses, for brevity.

Figure 6:
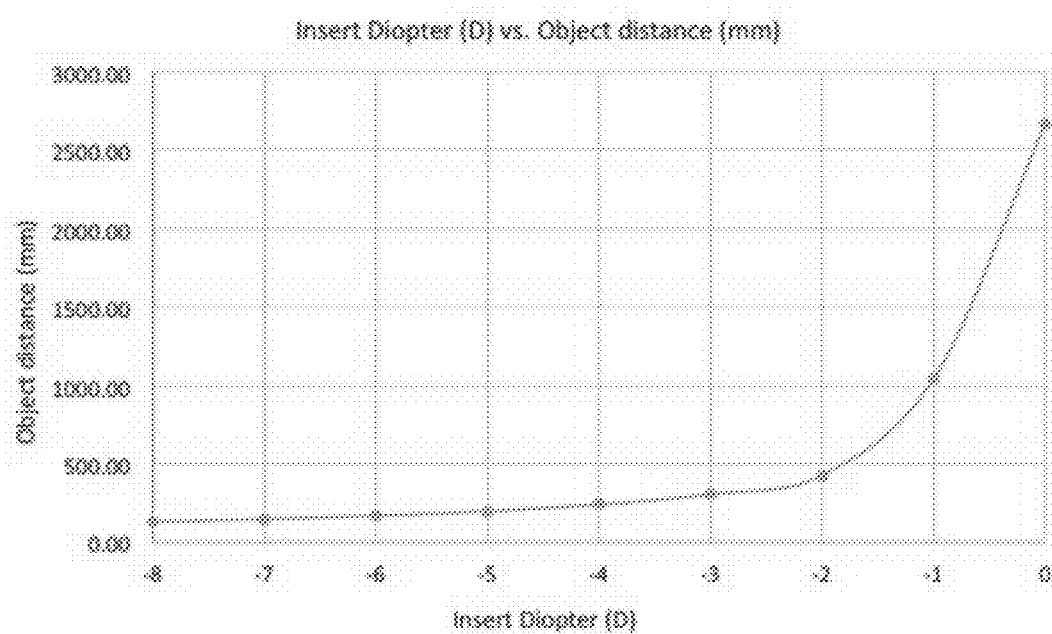
FIG. 6 is a plot of typical focal adjustment Diopter requirement vs. virtual object distance.

Referring now to FIG. 6, a typical focal adjustment Diopter requirement is plotted vs. distance to a virtual object. It is seen that a range of about 8 Diopters is sufficient to compensate for virtual object distances ranging from about 110 mm to about 2.7 m. In one embodiment, the 4.5 Diopter optical power adjustment range of the LC Alvarez lens is applied to a portion of the range shown in FIG. 6, e.g. from about 200 mm to 2.7 m. In this embodiment, a fixed optical power lens may be added to the LC Alvarez lens to shift the total optical power range as required. For example, if the fixed lens has an optical power of 2 Diopters, then the fixed lens—LC Alvarez lens combination has a range of 2 Diopters to 6.5 Diopters. If the fixed lens has an optical power of 3.5 Diopters, then the fixed lens—LC Alvarez lens combination has a range of 3.5 Diopters to 8 Diopters, and so on.

Figure 7A:
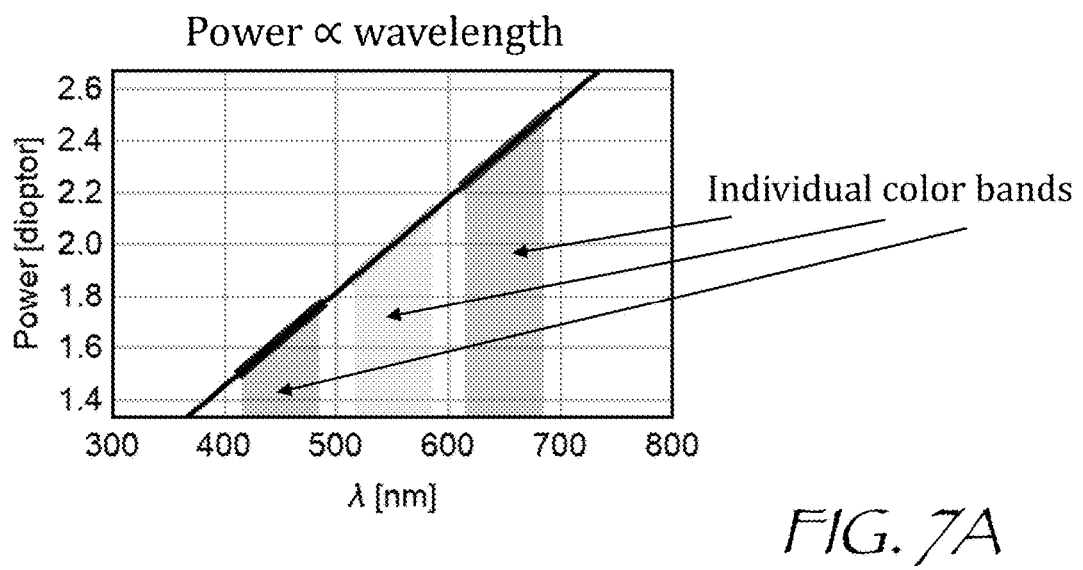
FIGS. 7A and 7B are spectral plots of optical power (FIG. 5A) and focal length (FIG. 5B) of a PBP LC lens.
Figure 7B:
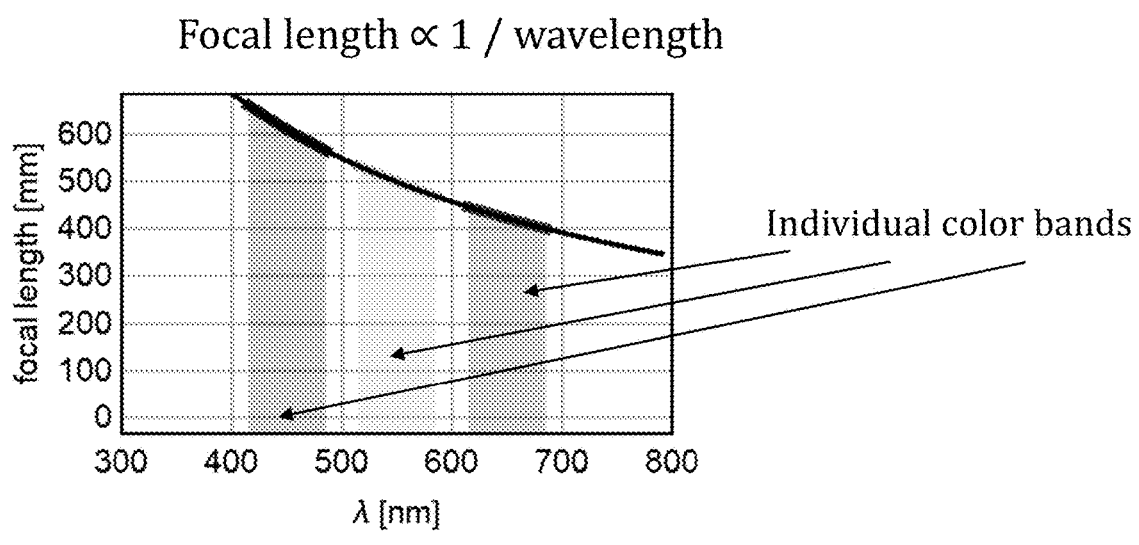
Figure 8:
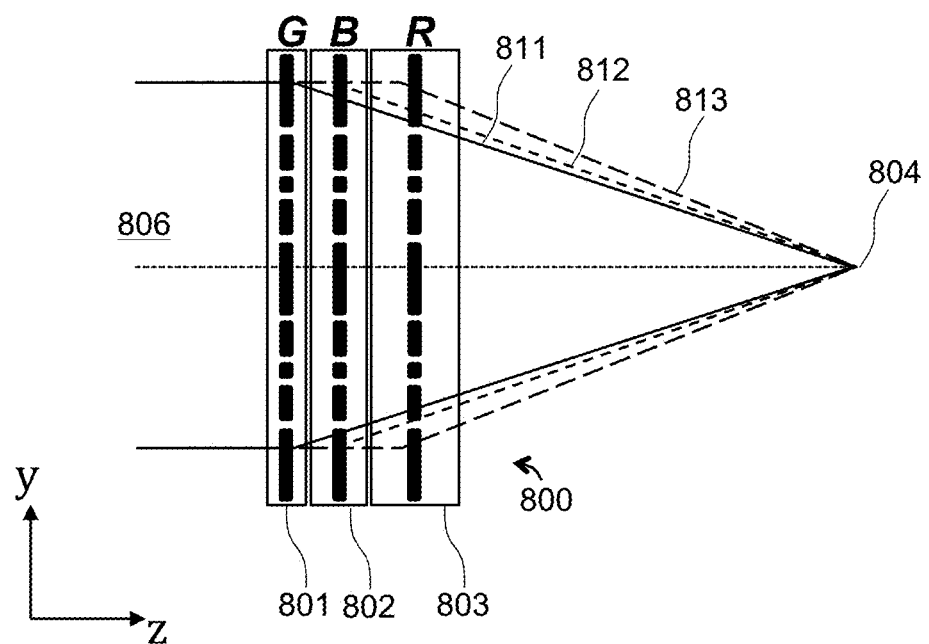
FIG. 8 is a schematic side view of a three-layer PBP LC lens having a reduced chromatic focal shift.

PBP LC Alvarez lenses may exhibit a strong wavelength dependence of beam deflection or focusing. A PBP LC lens will exhibit optical power in Diopter directly proportional to the wavelength λ, as shown in FIG. 7A. Equivalently, a PBP LC lens will exhibit focal length inversely proportional to the wavelength λ, as shown in FIG. 7B. If such a lens were used to collimate and direct light from a color display, which typically has three primary color channels, only one color channel would appear in-focus to the viewer. To make sure that all three color channels are focused correctly, a stack of three LC Alvarez lens elements may be used, one for each color channel. By way of a non-limiting example, referring to FIG. 8, an LC PBP device 800 is a stack including three LC PBP lens components: G lens component 801 for green color, B lens component 802 for blue color, and R lens component 803 for red color. To make sure the lens components 801-803 focus light of different colors to a same point 804, a condition $$f_R \lambda_R = f_G \lambda_G = f_B \lambda_B \qquad (2)$$

may be imposed. Herein, f denotes the focal length of the corresponding lens component (R, G, or B). In FIG. 8, a green beam component 811 (solid lines) of a beam 806 is focused by the G lens component 801 only; a blue beam component 812 (short-dash lines) is focused by the B lens component 802 only; and a red beam component 813 (long-dash lines) is focused by the R lens component 803 only. To provide zero optical power at wavelengths of the other color channels, the R, G, B lens thicknesses are selected such that their optical retardation at both other wavelengths is integer number of waves, or even number of half wavelengths, resulting in zero PBP and, accordingly, zero optical power at the other two color channels. To provide focusing/defocusing power at the R, G, B channel wavelengths, the R, G, B lens thicknesses are selected such that their optical retardation at their own wavelengths is an odd number of half wavelengths, resulting in a non-zero PBP and, accordingly, a non-zero optical power of the R, G, B lenses. In this manner, an "achromatic" performance of LC PBP Alvarez lens components may be obtained. It is to be understood that the term "achromatic" is used herein to indicate a reduced dependence of performance of the LC PBP devices on wavelength, and the complete achromaticity may not be achieved due to intra-channel wavelength dependence of optical retardation. The intra-channel wavelength dependence of optical retardation can be seen, for example, in FIGS. 7A and 7B showing the optical power and focal length being non-constant across widths of individual color bands.

Figure 9:
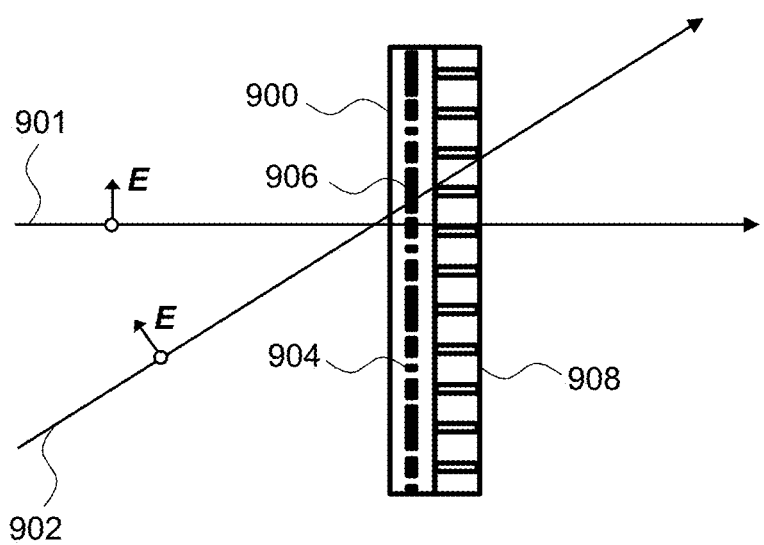
FIG. 9 is a schematic side view of a PBP LC lens with a c-plate for wide-angle operation.

So far, the performance of the PBP LC Alvarez lenses has been considered on-axis, that is, at normal angle of incidence of an impinging optical beam. At normal incidence, the local retardation of the LC layer is one half of the wavelength, or more generally, an odd number of half wavelengths. However, off-axis, that is, at non-zero angles of incidence of incoming light, the retardation may deviate from half wavelength. By way of example, referring to FIG. 9, an oblique ray 902 impinges on a PBP LC Alvarez lens component 900. While the oblique ray 902 may remain perpendicular to some LC molecules 904, the oblique ray 902 is no longer perpendicular to other LC molecules 906, depending on a local orientation of the LC molecules. The non-perpendicular angle of incidence causes an effective refractive index to change. This happens because the effective refractive index is at maximum when the electric field vector E of the light beam is parallel to a dipole direction of the LC molecule, which is often the longitudinal direction of the LC molecules ("positive" LC molecules). For orthogonal (out of plane of FIG. 9) electric field vector shown in FIG. 9 with small circles, the effective refractive index is smaller, which causes birefringence. Therefore, the birefringence is at maximum for a direct ray 901 at normal angle of incidence impinges on the PBP LC Alvarez lens component 900.

For the oblique ray 902, the electric field vector E of the light beam is no longer parallel to a dipole direction of the LC molecule 906. As a result, the maximum effective refractive index reduces in magnitude, while the effective refractive index for the orthogonal E-field stays approximately the same, which causes the reduction of effective birefringence. Consequently, when the optical retardation R of the LC layer is ½ wavelength for the normal ray 901, the optical retardation R of the LC layer is (½−Δ[θ]) waves, where θ is the angle of incidence and A is the reduction of optical retardation due to reduction of birefringence. To offset or compensate this effect, a so-called c-plate 908, i.e. a sheet of birefringent material having a birefringence axis perpendicular to the plane of the sheet, may be added to at least one lens of the stack. The c-plate 908 tends to offset the reduction of the effective refractive index of the PBP Alvarez lens component 900, because for the oblique ray 902, the c-plate 908 retardation change Δ'[θ] is of opposite sign: Δ'[θ]≈−Δ[θ]. As a result, the optical retardation R is brought back to half the wavelength, which reduces the dependence of performance of the PBP Alvarez lens component 900 on angle of incidence and increases its acceptance angle.

Figure 10A:
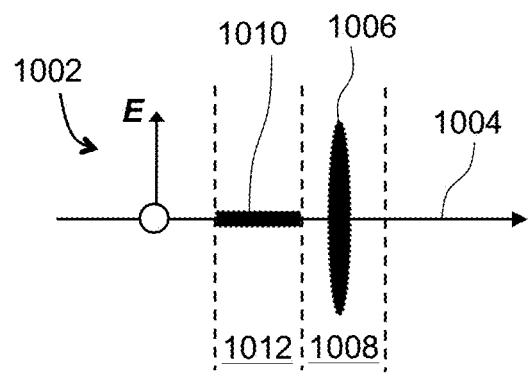
FIGS. 10A and 10B are schematic diagrams of c-plane and LC layer at different angles of incidence of incoming light, illustrating the compensating effect of the c-plate of FIG. 9.
Figure 10B:
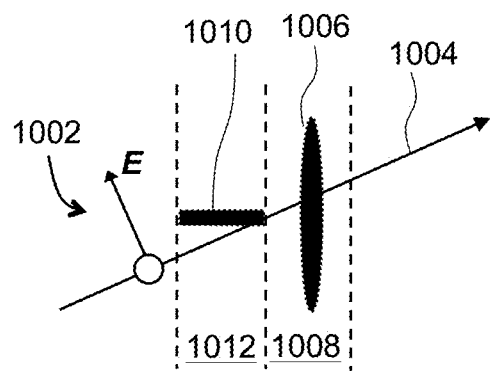

The effect of reduction of off-axis variation of optical retardation is further illustrated in FIGS. 10A and 10B. Two scenarios are considered. At normal angle of incidence (FIG. 10A), an electric field vector 1002 of an incoming optical beam 1004 is parallel to a LC molecule 1006 of a LC layer 1008 and perpendicular to an axis of birefringence 1010 of a c-plate 1012. Accordingly, the effective refractive index of the LC layer, and associated birefringence, is at maximum, and the effective refractive index of the c-plate 1012 is at minimum. At an oblique angle of incidence (FIG. 10B), the electric field vector 1002 is no longer parallel to the LC molecule 1006, which causes a reduction of the refractive index of the LC layer and the reduction of the associated birefringence. At the same time, the effective refractive index of the c-plate 1012 increases, offsetting the reduction of refractive index of the LC layer and maintaining optimal birefringence for off-axis optical beams. Other uniaxial plates, for example oblique symmetry plate or O-plate having a birefringence axis at an oblique angle to the plate, or an in-plane retardance plate or A-plate having a birefringence axis in-plane of the plate, may also be used. Any of these plates may include, for example, thin polymer sheets or films or LC films. Such plates or sheets are termed herein retardation sheets.

Figure 11:
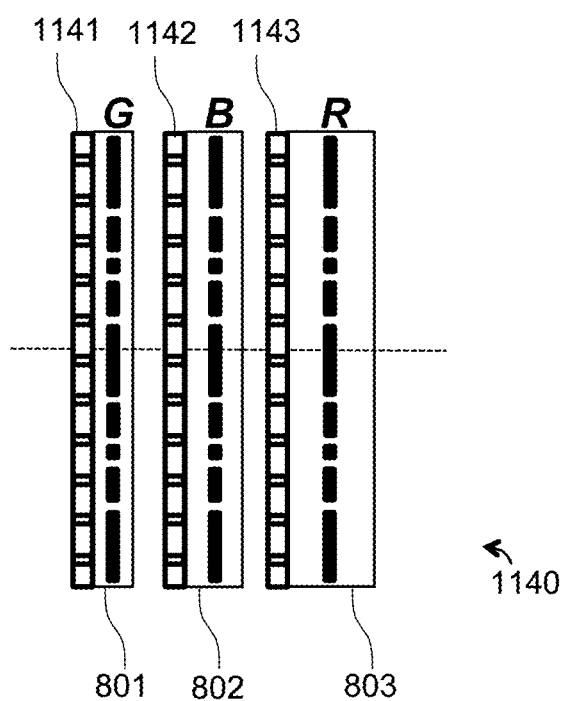
FIG. 11 is a schematic side view of a PBP LC device with a reduced chromatic focal shift and a c-plate for wide-angle operation.

Retardation sheets may be provided for any LC Alvarez lenses described herein. For example, referring to FIG. 11, a wide-angle achromatic LC PBP Alvarez lens component 1140 includes a retardation sheet 1141, 1142, and 1143 for each LC PBP lens component 801, 802, 803. Furthermore, in some embodiments, the birefringence axis direction of the retardation sheets may be at oblique angle to the plane of the retardation sheet, depending on a particular application.

In some embodiments, the LC Alvarez lens components described above are active components, in which the configurations of LC molecules may be "erased" by applying an electric field e.g. via a pair of transparent or semi-transparent electrodes, rendering optical power of these lenses zero regardless of mechanical position of LC Alvarez lens components. It is further noted that in so-called negative LC materials, the action of the electric field is reversed, i.e. the LC Alvarez lenses with negative LC fluid have zero optical power when the electric field is not applied, and have a non-zero optical power when the electric field is applied.

Figure 12A:
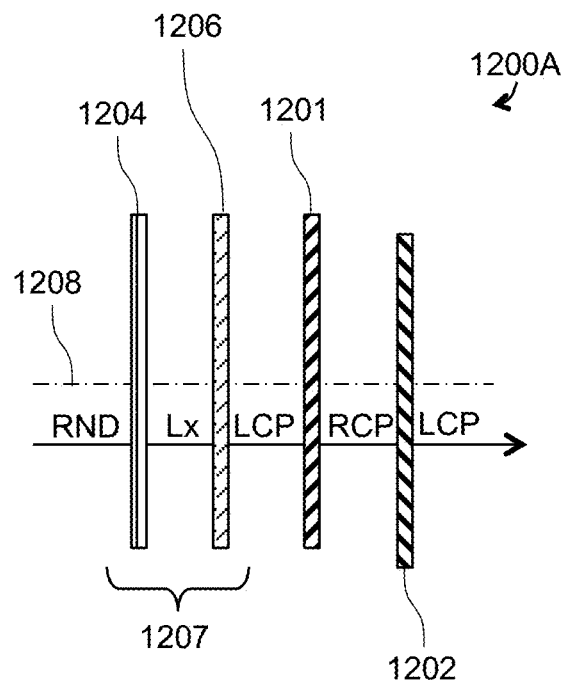
FIG. 12A is an exploded side view of an LC Alvarez lens stack having a polarizer upstream of the LC Alvarez lens for operation with unpolarized input light.

LC Alvarez lenses can be made to operate with a randomly polarized input light having 50% of x-linear polarization and 50% of uncorrelated y-linear polarization. Referring to FIG. 12A, an LC Alvarez lens 1200A includes first 1201 and second 1202 LC Alvarez lens components, e.g. LC PBP Alvarez components with a half-wave retardation, movable relative to one another to adjust optical power of the LC Alvarez lens. The LC Alvarez lens 1200A may further include a linear polarizer 1204 and a quarter-wave waveplate 1206 disposed in an optical path 1208 upstream of the first 1201 and second 1202 LC Alvarez lens components. The linear polarizer 1204 is disposed upstream of the quarter-wave waveplate 1206, as shown. Together, the linear polarizer 1204 and quarter-wave waveplate 1206 function as a circular polarizer 1207 for randomly polarized (RND) input light. To that end, a birefringence axis of the quarter-wave waveplate 1206 may be disposed at 45 degrees angle relative to a transmission axis of the linear polarizer 1204, to produce a circular polarized light propagated through the quarter-wave waveplate 1206. As an illustration only, it is assumed that the transmission axis of the linear polarizer 1204 is oriented along x-direction, such that only x-polarized light 1210 is transmitted by the linear polarizer 1204, and the y-polarized light is blocked. The x-polarized light 1210 becomes e.g. left-circular polarized after propagating through the quarter-wave waveplate 1206. The first LC PBP component 1201 may be configured for operation with LCP incoming light, and the second LC PBP component 1202 may be configured for operation with right circular polarized (RCP) incoming light. Since the first 1201 and second 1202 LC PBP Alvarez components have a half-wave retardation in this example, the LCP light will become RCP light after propagating through the first LC PBP Alvarez lens 1201, and the RCP light will become LCP light again after propagating through the second LC PBP Alvarez lens 1202.

Figure 12B:
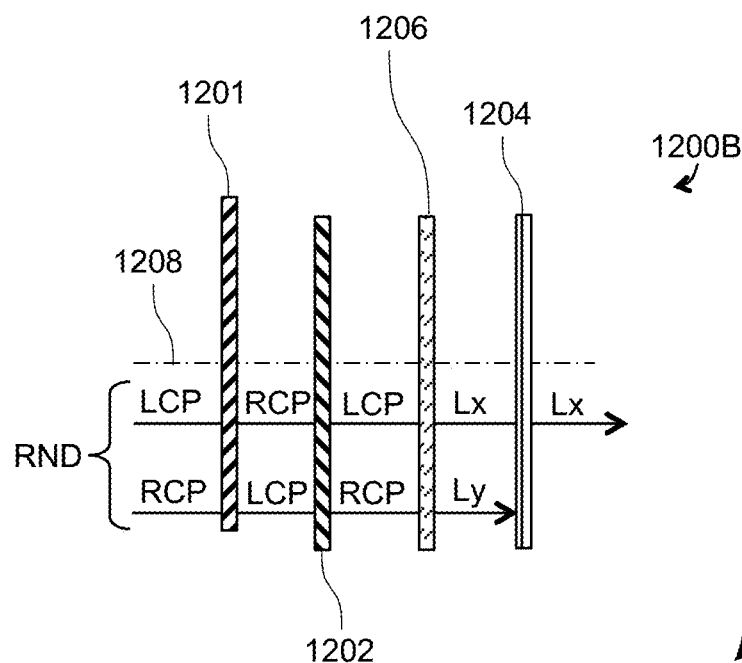
FIG. 12B is an exploded side view of an LC Alvarez lens stack having a polarizer downstream of the LC Alvarez lens for operation with unpolarized input light.

The position and orientation of the circular polarizer may be reversed. Referring to FIG. 12B, an LC Alvarez lens 1200B is similar to the LC Alvarez lens 1200A of FIG. 12A. In the embodiment of LC Alvarez lens 1200B of FIG. 12B, the linear polarizer 1204 and the quarter-wave waveplate 1206 are disposed in the optical path 1208 downstream of the first 1201 and second 1202 LC Alvarez lens components. The linear polarizer 1204 is disposed downstream of the quarter-wave waveplate 1206. In FIG. 12B, a randomly polarized input light RND has 50% of LCP light and 50% of uncorrelated RCP light, each being traced separately through the LC Alvarez lens 1200B for the purpose of illustration. For the first LC Alvarez lens component 1201 to operate properly, an input LCP light is required. The LCP light becomes RCP after propagating through the first LC Alvarez lens component 1201, which is the correct input polarization for the second LC Alvarez lens component 1202. After this component, the light becomes LCP again. A birefringence axis of the quarter-wave waveplate 1206 is oriented such as to convert the LCP light into linearly polarized light with polarization along x-axis, which then propagates through the linear polarizer 1204 having its polarization axis (i.e. transmission axis) along x-direction. The RCP light has an "incorrect" polarization for the first LC Alvarez lens component 1201, in a sense that at this polarization, the optical power of the first LC Alvarez lens component has opposite sign of what is required for intended operation. As shown FIG. 12B, this "incorrect" polarization component becomes eventually linearly y-polarized, and is blocked by the linear polarizer 1204. A depolarizer, not shown, may be provided as an upstream component of the LC Alvarez lenses 1200A and 1200B, to convert input light, however polarized, into a randomly-polarized light having an equal measure of two uncorrelated orthogonal polarizations, e.g. x- and y-linear polarizations Lx and Ly, or LCP and RCP. It is further noted that in some applications, no polarizer may be required for an LC Alvarez lens based optical stack. By way of a non-limiting example, in the AR display embodiment 300B of FIG. 3B, no polarizer is needed; because the front stack, i.e. the compensating LC Alvarez lens 306, and back stack, i.e. the adaptive LC Alvarez lens 304, compensate each other for both RCP or LCP incident light 318. For example, when optical power of one stack is positive for RCP light, the optical power of the other stack will be negative, and vice versa.

Figure 12C:
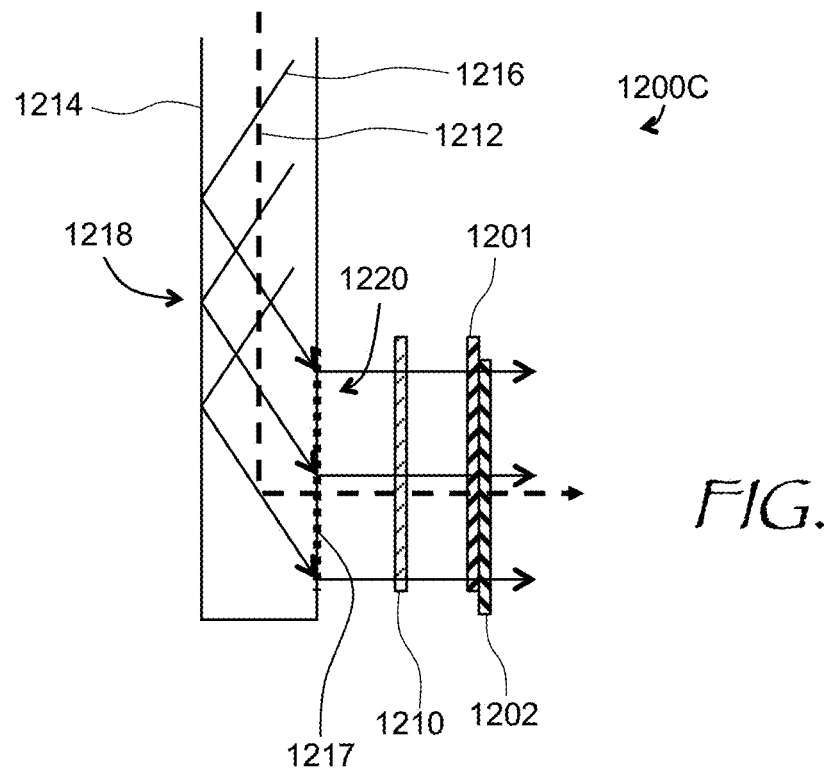
FIG. 12C is an exploded fractional side view of near-eye display module having a phase element for operation in conjunction with a waveguide.

Turning to FIG. 12C, a near-eye display module 1200C includes the first 1201 and second 1202 LC Alvarez lens components, a phase element 1210 disposed in an optical path 1212 upstream of the LC Alvarez lens, and a waveguide 1214 disposed in the optical path 1212 upstream of the phase element 1210. In operation, the waveguide 1214 carries image light 1216 from an electronic display, not shown. The image light 1216 may be out-coupled by a coupling element 1217 such as a diffraction grating, a holographic grating, one or more cascaded reflectors, one or more prismatic surface elements, a metalens, a refractive surface at an angle with or without optical power, an array of holographic reflectors, etc. The waveguide 1214 carries the image light 1216 via reflections 1218, i.e. total internal reflections, from its inner surfaces. In one embodiment, the waveguide 1214 is a polarizing waveguide configured such that the image light 1216 becomes fully polarized after a series of reflections 1218, such that the waveguide 1214 functions not only as a light-carrying element but also as a linear polarizer. In this embodiment, the phase element 1210 may include a quarter-wave waveplate, similarly to the LC Alvarez lens 1200A of FIG. 12A. In another embodiment, the waveguide 1214 does not linearly polarize the image light 1216. Rather, the waveguide 1214 produces light with at least one of polarization axis or ellipticity spatially varying across a clear aperture 1220 of the waveguide 1214. In this embodiment, the phase element 1210 may include a spatially varying retarder, e.g. a retarder comprising an LC layer with at least one of azimuthal angle or tilt angle of LC molecules of the LC layer spatially varying to compensate for the spatially varying polarization axis and/or ellipticity of the image light 1216, so as to produce a circular polarization of light at the output of the spatially varying retarder. For AR applications, a compensating phase element and a compensating LC Alvarez lens may be provided upstream of the waveguide 1214 to compensate or offset the optical power of the LC Alvarez lens components 1201 and 1202 and to offset the retardation of the phase element 1210. This is similar to the AR display embodiment 300B of FIG. 3B. The compensating phase element may also include a spatially varying retarder with local axis of birefringence varying at 90 degrees (when looking along the optical axis) to the spatially varying local axis of birefringence orientation of the phase element 1210.

Figure 12D:
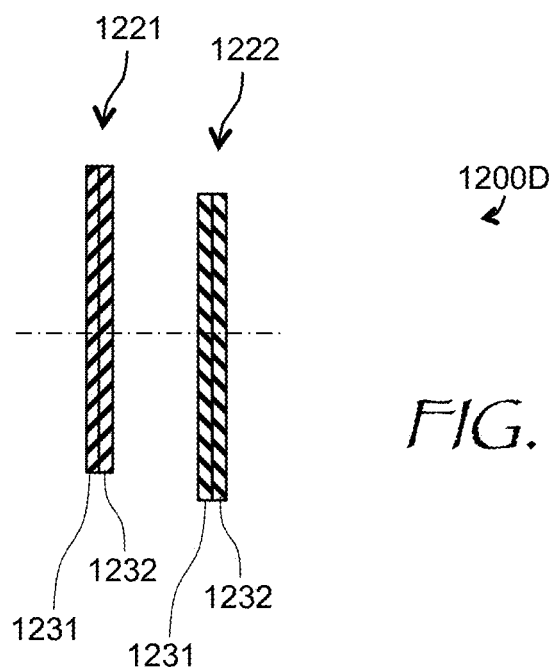
FIG. 12D is an exploded side view of an LC Alvarez lens stack for operation in unpolarized light.
Figure 12E:
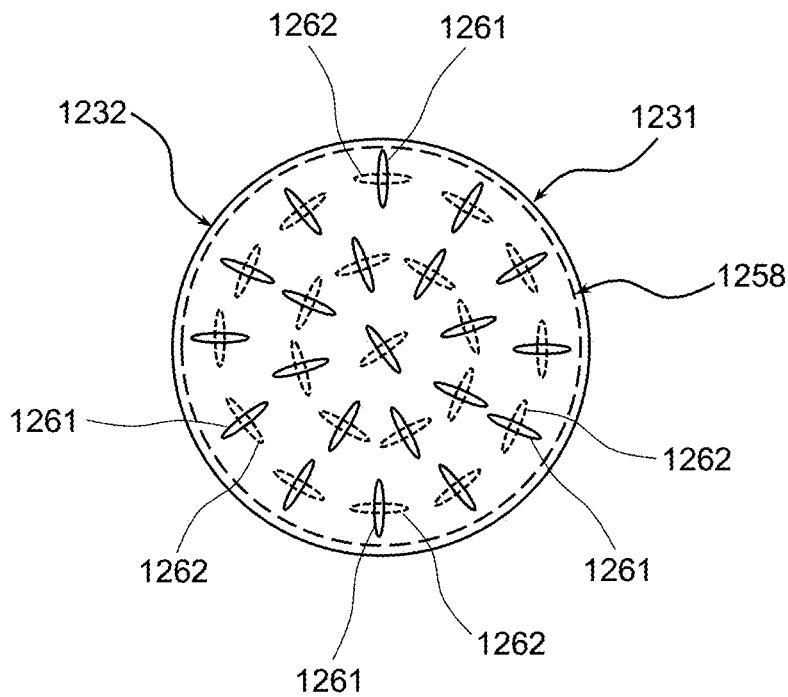
FIG. 12E is a plan view of superimposed LC Alvarez lens elements of FIG. 12D showing LC molecules azimuthal angle distribution.

Referring now to FIGS. 12D and 12E, an LC Alvarez lens 1200D includes first 1221 and second 1222 LC Alvarez lens components. Each one of the first 1221 and second 1222 LC Alvarez lens component comprises a pair of LC Alvarez lens elements 1231, 1232 configured for operation in unpolarized light. To that end, each LC Alvarez lens element 1231, 1232 may create an Alvarez optical phase profile by spatially varying a pre-tilt angle of LC molecules across a clear aperture 1258 of the LC Alvarez lens elements 1231, 1232, similar to pre-tilt angles $\phi_1, \phi_2, \ldots \phi_n$ of the LC molecules 408 in FIG. 4B. The local azimuthal angles of LC molecules 1261 (solid lines) of the LC Alvarez lens elements 1231 are perpendicular to corresponding local azimuthal angles of LC molecules 1262 (dotted lines) of the LC Alvarez lens elements 1232, such that a sensitivity of the first 1221 and second 1222 LC Alvarez lens components to polarization of incoming light is significantly lessened. It is noted that the azimuthal angles of the LC molecules in the LC Alvarez lens elements 1231, 1232 may also vary across the clear aperture 1258 of the LC Alvarez lens elements 1231, 1232, for as long as they remain perpendicular to each other. By way of a non-limiting example, in FIG. 12E, the first LC Alvarez lens elements 1231 include a radial azimuthal angle distribution, and the second LC Alvarez lens elements 1232 include a tangential azimuthal angle distribution. It is noted that FIG. 12E is just an example, and many other distributions are possible.

Figure 13:
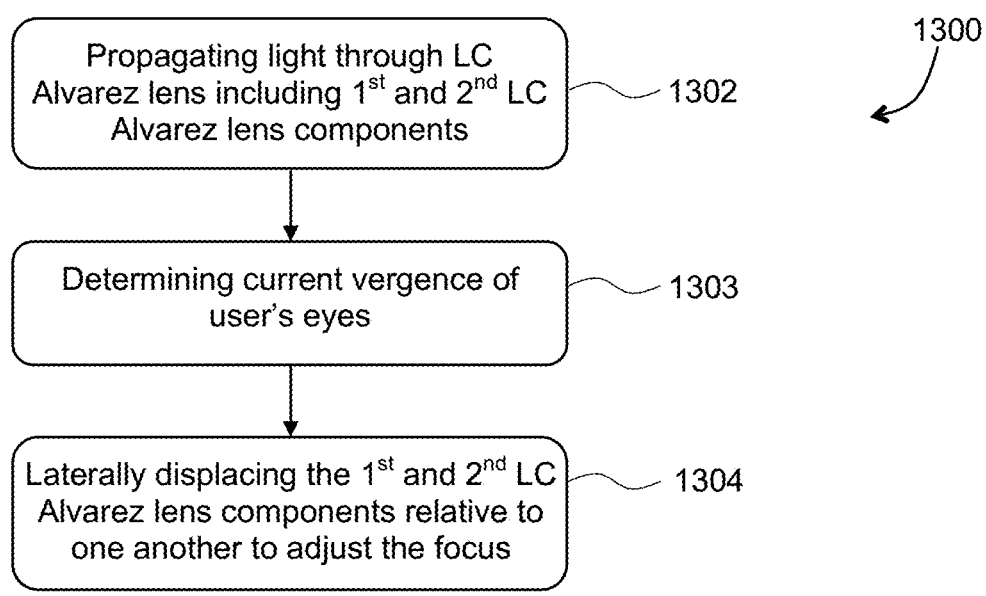
FIG. 13 is a flowchart of a method for adjusting focus of a visual display using an LC Alvarez lens of the present disclosure.

Referring to FIG. 13, a method 1300 for adjusting focus of a visual display includes propagating (1302) light emitted by the visual display through optically coupled first and second LC Alvarez lens components, e.g. LC Alvarez lens components 400A of FIG. 4A, 400B of FIG. 4B, 1201,1202 of FIGS. 12A-C, and 1221,1222 of FIG. 12D. Each such component has an Alvarez spatial profile of optical phase delay as explained above. The method 1300 also includes laterally displacing (1304) the first and second LC Alvarez lens components relative to one another to adjust the focus. The LC Alvarez lens components may be displaced e.g. as shown in FIG. 5B, by using a compact actuator 516 such as a DC motor, stepper motor, piezo-motor, etc. The adjustment can be performed in real time to lessen a vergence-accommodation conflict. To that end, the method 1300 may include determining (1303) a current vergence of user's eyes.

The adjustment of the LC Alvarez lens may also be done to offset a nearsightedness or farsightedness of a user. Furthermore, in a VR application, e.g. in the VR glasses 300A of FIG. 3A, a pair of LC Alvarez lenses may be used, e.g. the adaptive lenses 304 and 306 may include LC Alvarez lenses, in which the corresponding lens elements are displaced synchronously, as explained above with reference to FIG. 3B.

Figure 14:
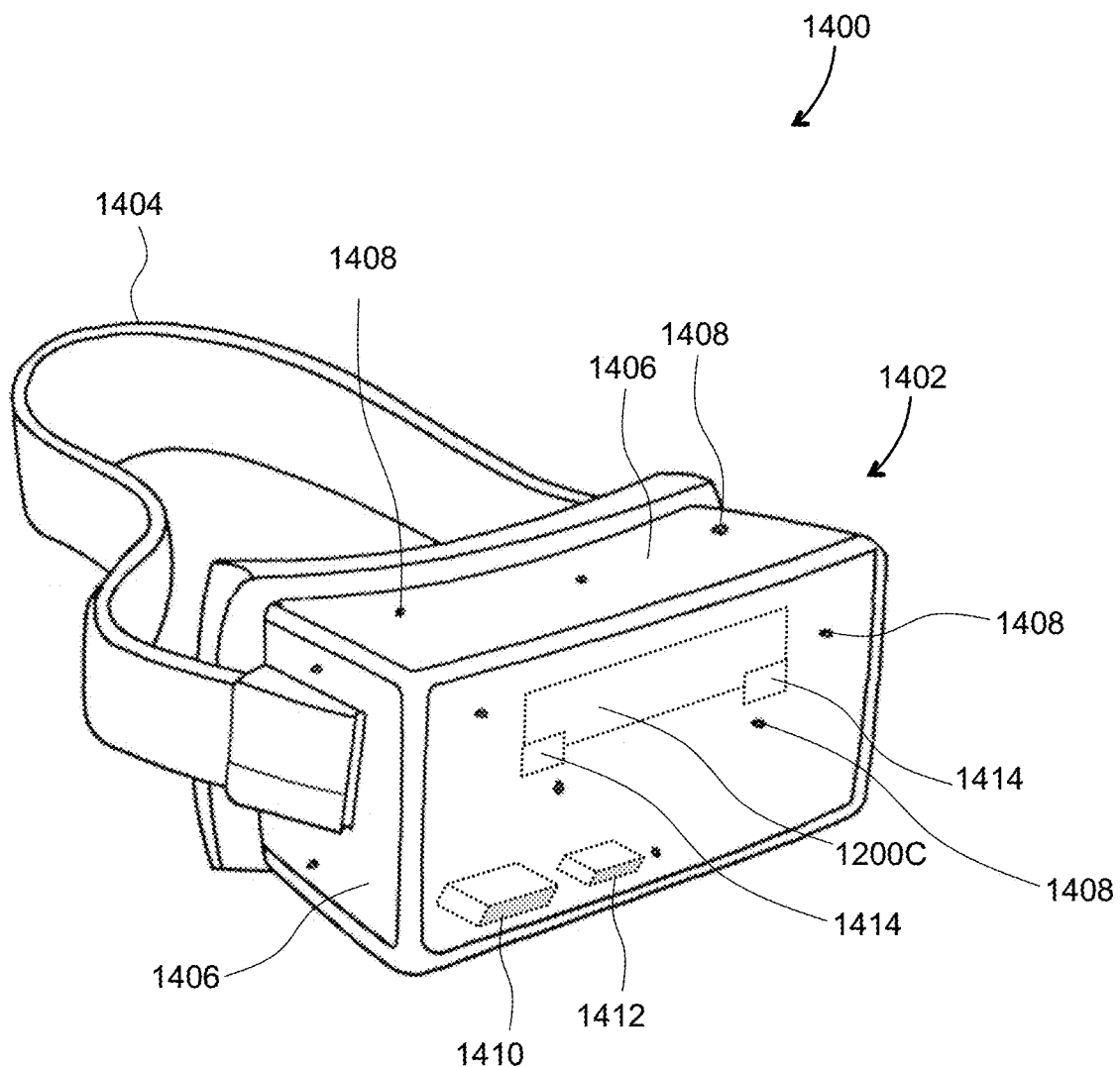
FIG. 14 is an isometric view of a head-mounted display (HMD)

Turning now to FIG. 14, a head-mounted display (HMD) 1400 may include LC Alvarez lenses and/or display module(s) described above. The HMD 1400 may provide content to a user as a part of an artificial reality system. The HMD 1400 may augment views of a physical, real-world environment with computer-generated imagery and/or to generate an entirely virtual 3D imagery. The HMD 1400 may include a front body 1402 and a head band 1404. The front body 1402 is configured for placement in front of eyes of a user, and the head band 1404 may be stretched to secure the front body 1402 on the user's head. A display module, such as the near-eye VR display module 1200C of FIG. 12C, may be disposed in the front body 1402 for presenting imagery to the user. The VR display module 1200C is shown in FIG. 14 as an illustration only, and other types of display modules with LC Alvarez lenses of this disclosure may be used. Sides 1406 of the front body 1402 may be opaque or transparent.

In some embodiments, the front body 1402 includes locators 1408, an inertial measurement unit (IMU) 1410 for tracking acceleration of the HMD 1400, and position sensors 1412 for tracking position of the HMD 1400. The locators 1408 are traced by an external imaging device of a virtual reality system, such that the virtual reality system can track the location and orientation of the entire HMD 1400. Information generated by the IMU and the position sensors 1412 may be compared with the position and orientation obtained by tracking the locators 1408, for improved tracking of position and orientation of the HMD. Accurate position and orientation is important for presenting appropriate virtual scenery to the user as the latter moves and turns in 3D space.

The HMD 1400 may further include an eye tracking system 1414, which determines orientation and position of user's eyes in real time. The obtained position and orientation of the eyes allows the HMD 1400 to determine the gaze direction of the user and to adjust the image generated by the display module 1200C accordingly. In one embodiment, the vergence, that is, the convergence angle of the individual gaze directions of user's eyes, is determined. The optical power of the LC Alvarez lenses may be the adjusted depending on the vergence to reduce or lessen the vergence-accommodation conflict. In one embodiment, the main collimating and redirecting function is performed by dedicated, non-adjustable lenses, and the LC Alvarez lenses of this disclosure are used for fine focus adjustment.

Figure 15A:
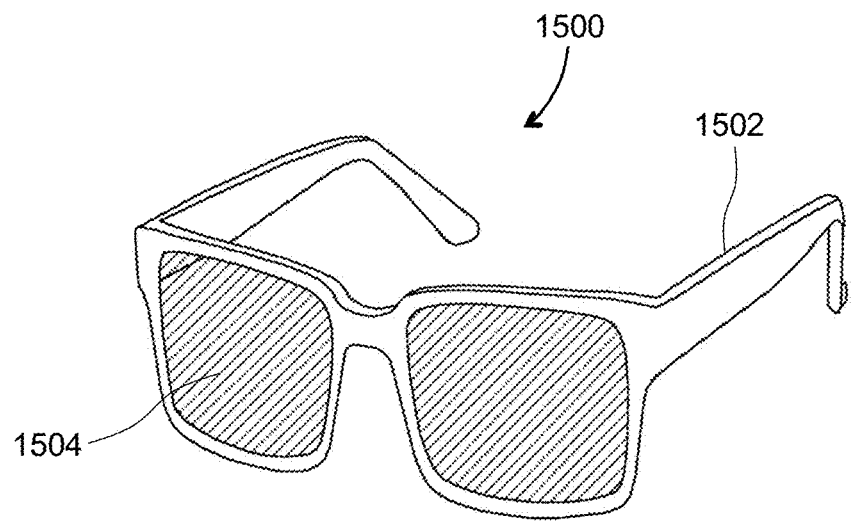
FIG. 15A is an isometric view of an eyeglasses form factor near-eye AR/VR display incorporating an LC Alvarez lens of the present disclosure.
Figure 15B:
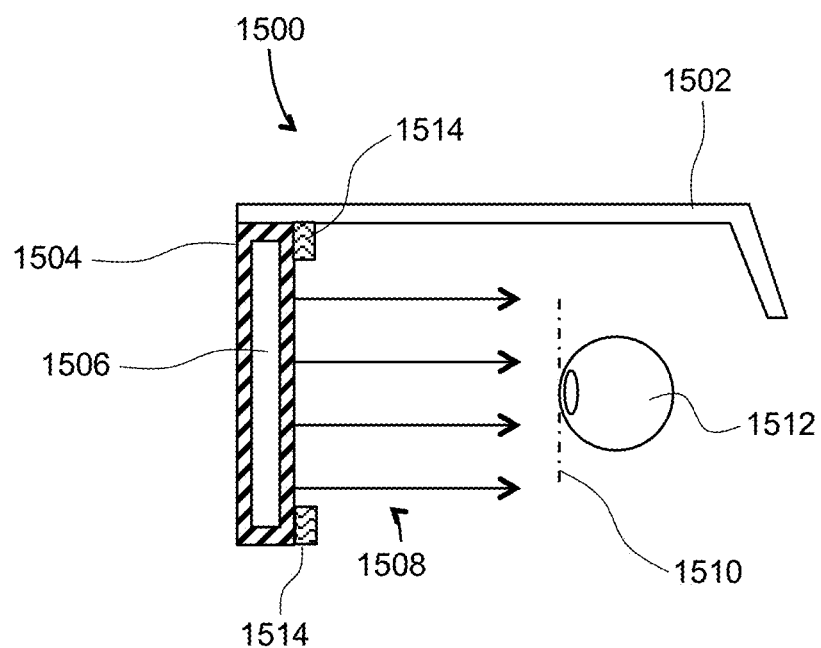
FIG. 15B is a side cross-sectional view of the display of FIG. 15A.

Referring to FIGS. 15A and 15B, a near-eye AR/VR display 1500 has a frame 1502 with a form factor of a pair of eyeglasses, and a display 1504 including a display assembly 1506 including, without limitation, the near-eye VR display module 1200C (FIG. 12C). The display assembly 1506 (FIG. 15) provides image light 1508 to an eyebox 1510, defined as a geometrical area where a good-quality image may be presented to a user's eye 1512. The display assembly 1506 may include a separate VR/AR display module for each eye, or one display module for both eyes. By way of a non-limiting example, an active, i.e. switchable, PBP LC grating may be coupled to a single electronic display for directing images to the left and right eyes of the user in a time-sequential manner, one frame for left eye and one frame for right eye. The electronic display may include, without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. More generally, such a display may be provided for any of the display modules or systems disclosed herein. The near-eye AR/VR display 1500 may also include an eye-tracking system 1514 for determining, in real time, the gaze direction and/or the vergence of the user's eyes 1512.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A liquid crystal (LC) Alvarez lens comprising: optically coupled first and second LC Alvarez lens components each having an Alvarez spatial profile of optical phase delay $T(x,y)=A_x x^3+A_x'yx^2+A_y y^3+A_y'xy^2+Ex+Fy+G$, wherein x, y are coordinates in a plane perpendicular to an optical axis of the LC Alvarez lens, and $A_x$, $A_x'$, $A_y$, $A_y'$, E, F, and G are constants;

wherein the LC Alvarez lens is configured for laterally displacing the first and second LC Alvarez lens components relative to one another for adjusting optical power of the LC Alvarez lens; and wherein at least one of the first and second LC Alvarez lens components comprises an LC layer in the x,y plane having a thickness d and effective refractive index $n(x,y)$, such that $T(x,y)=2\pi d n(x,y)/\lambda$, wherein $\lambda$ is wavelength.

2. The LC Alvarez lens of claim 1, wherein at least one of the first and second LC Alvarez lens components comprises an LC layer having a tilt angle of LC molecules relative to a plane of the LC layer, wherein the tilt angle spatially varies across the plane of the LC layer.

3. The LC Alvarez lens of claim 2, wherein the at least one of the first and second LC Alvarez lens components comprises at least one of polarization volume holographic LC lens or a LC Fresnel lens.

4. The LC Alvarez lens of claim 3, wherein each one of the polarization volume holographic LC lens or an LC Fresnel lens comprises a retardation sheet for widening a viewing angle of the Alvarez lens.

5. The LC Alvarez lens of claim 1, further comprising an actuator for displacing the first and second LC Alvarez lens components relative to one another laterally with respect to an optical axis of the LC Alvarez lens.

6. A liquid crystal (LC) Alvarez lens comprising: optically coupled first and second LC Alvarez lens components each having an Alvarez spatial profile of optical phase delay;

wherein the LC Alvarez lens is configured for laterally displacing the first and second LC Alvarez lens components relative to one another for adjusting optical power of the LC Alvarez lens; and wherein at least one of the first and second LC Alvarez lens components comprises an LC layer having a birefringence of odd number of half wavelengths.

7. The LC Alvarez lens of claim 6, wherein the LC layer has an azimuthal angle of LC molecules θ spatially varying in plane of the LC layer such that a spatial variation of θ is defined by a cubic polynomial $\theta(x,y)=\frac{1}{2}(A_x x^3+A_x'yx^2+A_y y^3+A_y'xy^2+Ex+Fy+G)$, wherein x, y are coordinates in the plane of the LC layer, and $A_x$, $A_x'$, $A_y$, $A_y'$, E, F, and G are constants.

8. The LC Alvarez lens of claim 7, wherein the at least one of the first and second LC Alvarez lens components further comprises a retardation sheet for widening a viewing angle of the LC Alvarez lens.

9. The LC Alvarez lens of claim 8, wherein the retardation sheet comprises a birefringent film having a birefringence axis perpendicular to plane of the birefringent film.

10. The LC Alvarez lens of claim 6, wherein each one of the first and second LC Alvarez lens components comprises a Pancharatnam-Berry phase (PBP) LC lens comprising an LC layer in x, y plane and having an azimuthal angle of LC molecules θ spatially varying in plane of the LC layer, such that a spatial variation of θ is defined by a cubic polynomial $\theta(x,y)=\frac{1}{2}(A_x x^3+A_x'yx^2+A_y y^3+A_y'xy^2+Ex+Fy+G)$, wherein x, y are coordinates in the x, y plane, and $A_x$, $A_x'$, $A_y$, $A_y'$, E, F, and G are constants.

11. The LC Alvarez lens of claim 10, wherein each PBP LC lens comprises a stack of PBP LC lens elements, wherein each PBP LC lens element has a birefringence of odd number of half wavelengths at one color channel, and even number of half wavelengths at remaining color channels.

12. A liquid crystal (LC) Alvarez lens comprising: optically coupled first and second LC Alvarez lens components each having an Alvarez spatial profile of optical phase delay;

wherein the LC Alvarez lens is configured for laterally displacing the first and second LC Alvarez lens components relative to one another for adjusting optical power of the LC Alvarez lens;

the LC Alvarez lens further comprising a linear polarizer and a quarter-wave waveplate disposed in an optical path upstream of the first and second LC Alvarez lens components;

wherein the linear polarizer is disposed upstream of the quarter-wave waveplate, and wherein the quarter-wave waveplate is oriented to produce a circular polarization of light propagated through the quarter-wave waveplate; or wherein the linear polarizer is disposed downstream of the quarter-wave waveplate, and wherein the quarter-wave waveplate is oriented to produce a linear polarization of light propagated through the quarter-wave waveplate.

13. A liquid crystal (LC) Alvarez lens comprising: optically coupled first and second LC Alvarez lens components each having an Alvarez spatial profile of optical phase delay;

wherein the LC Alvarez lens is configured for laterally displacing the first and second LC Alvarez lens components relative to one another for adjusting optical power of the LC Alvarez lens; and wherein each one of the first and second LC Alvarez lens components comprises a plurality of LC Alvarez lens elements configured for operation in unpolarized light.

14. A near-eye display module comprising:

a liquid crystal (LC) Alvarez lens comprising optically coupled first and second LC Alvarez lens components each having an Alvarez spatial profile of optical phase delay, wherein the LC Alvarez lens is configured for laterally displacing the first and second LC Alvarez lens components relative to one another for adjusting optical power of the LC Alvarez lens;

a phase element disposed in an optical path upstream of the LC Alvarez lens; and a waveguide disposed in the optical path upstream of the phase element.

15. The near-eye display module of claim 14, wherein the waveguide comprises a polarizing waveguide, and wherein the phase element comprises a quarter-wave waveplate oriented to produce a circular polarization of light propagated through the quarter-wave waveplate.

16. The near-eye display module of claim 14, wherein the phase element comprises a spatially varying retarder; wherein in operation, the waveguide produces light with at least one of polarization axis or ellipticity spatially varying across a clear aperture of the waveguide, and wherein the spatially varying retarder comprises an LC layer with at least one of azimuthal angle or tilt angle of LC molecules of the LC layer spatially varying to produce a circular polarization of light propagated through the spatially varying retarder.

* * * * *